United States Patent
Lennen

(10) Patent No.: US 10,725,183 B2
(45) Date of Patent: Jul. 28, 2020

(54) GNSS MULTIPATH MITIGATION VIA PATTERN RECOGNITION

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

( * ) Notice: Subject to any disclaimer, the term of this patent is extended or adjusted under 35 U.S.C. 154(b) by 240 days.

(21) Appl. No.: 15/986,492

(22) Filed: May 22, 2018

(65) Prior Publication Data

US 2019/0257953 A1     Aug. 22, 2019

Related U.S. Application Data

(60) Provisional application No. 62/633,760, filed on Feb. 22, 2018.

(51) Int. Cl.
    *G01S 19/22*           (2010.01)

(52) U.S. Cl.
    CPC ................... *G01S 19/22* (2013.01)

(58) Field of Classification Search
    CPC .......... G01S 19/09; G01S 19/13; G01S 19/22; H04B 1/7095
    See application file for complete search history.

(56) References Cited

U.S. PATENT DOCUMENTS

| | | | | |
|---|---|---|---|---|
| 6,198,765 | B1 * | 3/2001 | Cahn ...................... | G01C 21/26 370/335 |
| 6,249,542 | B1 * | 6/2001 | Kohli ...................... | G01C 21/26 375/148 |
| 7,095,811 | B1 * | 8/2006 | Shikh-Bahaei ....... | H03M 13/33 375/340 |
| 8,305,268 | B2 | 11/2012 | Lennen | |

(Continued)

FOREIGN PATENT DOCUMENTS

| CN | 106896378 | 6/2017 |
|---|---|---|
| EP | 1 567 886 | 5/2006 |

(Continued)

OTHER PUBLICATIONS

Global positioning systems directorate systems engineering & integraton—Interface Specification IS-GPS-200H, Navstar GPS Space Segment/Navigation User Interfaces, Sep. 24, 2013, 226 pages.

(Continued)

*Primary Examiner* — Dao L Phan
(74) *Attorney, Agent, or Firm* — The Farrell Law Firm, P.C.

(57) ABSTRACT

Systems, methods and apparatuses for multipath mitigation of received global navigation satellite system (GNSS) signals by using pattern recognition are described. One method includes summing correlations of received GNSS signals over time to generate a correlation window. The present system/method recognizes a pattern of a stored correlation window which matches the generated correlation window. The stored correlation window is one of a plurality of stored correlation windows, and each of the plurality of stored correlation window is stored with a corresponding range error. The stored range error corresponding to the matching stored correlation window is used to improve GNSS range measurement.

18 Claims, 9 Drawing Sheets

(56) References Cited

U.S. PATENT DOCUMENTS

| | | | |
|---|---|---|---|
| 8,442,097 B2 | 5/2013 | Fenton et al. | |
| 8,599,067 B2 | 12/2013 | Lennen | |
| 9,291,717 B2 | 3/2016 | Lennen | |
| 9,482,760 B2 | 11/2016 | Lennen | |
| 9,730,111 B2 | 8/2017 | Kose et al. | |
| 9,784,845 B2 | 10/2017 | Lennen | |
| 2003/0072356 A1 | 4/2003 | Abraham et al. | |
| 2013/0051434 A1 | 2/2013 | Draganov et al. | |

FOREIGN PATENT DOCUMENTS

| | | |
|---|---|---|
| EP | 2 739 986 | 1/2018 |
| WO | WO 01/59940 | 8/2001 |

OTHER PUBLICATIONS

European GNSS (Galileo) open service, Signal in space Interface Control Document, European Union 2016, version 1.3, Dec. 2016, 88 pages.

Global positioning systems directorate systems engineering & integration—Interface specification IS-GPS-800D, Navstar GPS Space Segment/User Segment L1C Interface, Sep. 24, 2013, 127 pages.

Global Navigation Sattelite System, Glonass, Interface Control Document, Navigational radiosignal In bands L1, L2, (Edition 5.1) Moscow 2008, 65 pages.

BeiDou navigation satellite system—Signal in space interface control document, Open service signal BII, China Satellite Navigation Office, version 1.0, Dec. 2012, 81 pages.

Indian Space Research Organization, Indian Regional Navigation Satellite System, Signal in Space ICD for Standard Positioning Service, Version 1.1, Aug. 2017, 72 pages.

The Cabinet Office, Government of Japan ("CAO") and Quasi-Zenith Satellite Systems Services Inc., Quasi-Zenith Satellite System Interface Specification Satellite Positioning, Navigation and Timing Service, Mar. 28, 2017, 148 pages.

Petovello, Mark, GNSS Solutions: Multipath vs. NLOS signals, How Does Non-Line-of-Sight Reception Differ from Multipath Interference, Inside GNSS, Nov./Dec. 2013, pp. 40-44.

Groves, Paul D., et al., Height Aiding, C/No Weighting and Consistency Checking for GNSS NLOS and Multipath Mitigation in Urban Areas, The Journal of Navigation (2013), 66, pp. 653-669.

\* cited by examiner

GNSS MULTIPATH MITIGATION VIA PATTERN RECOGNITION

PRIORITY

This application claims priority under 35 U.S.C. § 119(e) to U.S. Provisional Patent Application Ser. No. 62/633,760 filed on Feb. 22, 2018, the entire disclosure of which is incorporated herein by reference.

FIELD

The present disclosure relates generally to navigation systems, and more particularly, to providing performance improvement in global navigation satellite system (GNSS) receivers via pattern recognition.

BACKGROUND

Satellite navigational systems provide positional and timing information to earth-bound receivers, sometimes referred to as position, velocity, and timing (PVT) and/or position, navigation, and timing (PNT) measurements. Each system has its own constellation of satellites orbiting the Earth, and, in order to calculate its position, a receiver on Earth uses the satellites "in view" (i.e., in the sky above) from that system's constellation. GNSS is often used as the generic term for such a system, even though such navigational satellite systems include regional and augmented systems—i.e., systems that are not truly "global." The term "GNSS," as used herein, covers any type of navigational satellite system, global, regional, augmented or otherwise, unless expressly indicated otherwise.

SUMMARY

According to one aspect of the present disclosure, a method is provided for multipath mitigation for a global navigation satellite system (GNSS) receiver, including summing correlations of received GNSS signals over time to generate a correlation window ($C_{window}$); preprocessing the generated $C_{window}$ to generate $C_{used}$; comparing the generated $C_{used}$ with a plurality of stored $C_{used}$s to find a matching stored $C_{used}$, wherein each of the plurality of stored $C_{used}$s is stored with a corresponding range error; and using the stored range error corresponding to the matching stored $C_{used}$ to improve a range measurement.

According to another aspect of the present disclosure, an apparatus is provided, which includes one or more non-transitory computer-readable media; and at least one processor which, when executing instructions stored on one or more non-transitory computer readable media, performs the steps of summing correlations of received GNSS signals over time to generate a correlation window ($C_{window}$); preprocessing the generated $C_{window}$ to generate $C_{used}$; comparing the generated $C_{used}$ with the plurality of stored $C_{used}$s to find a matching stored $C_{used}$, wherein each of the plurality of stored $C_{used}$s is stored with a corresponding range error; and using the stored range error corresponding to the matching stored $C_{used}$ to improve a range measurement.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
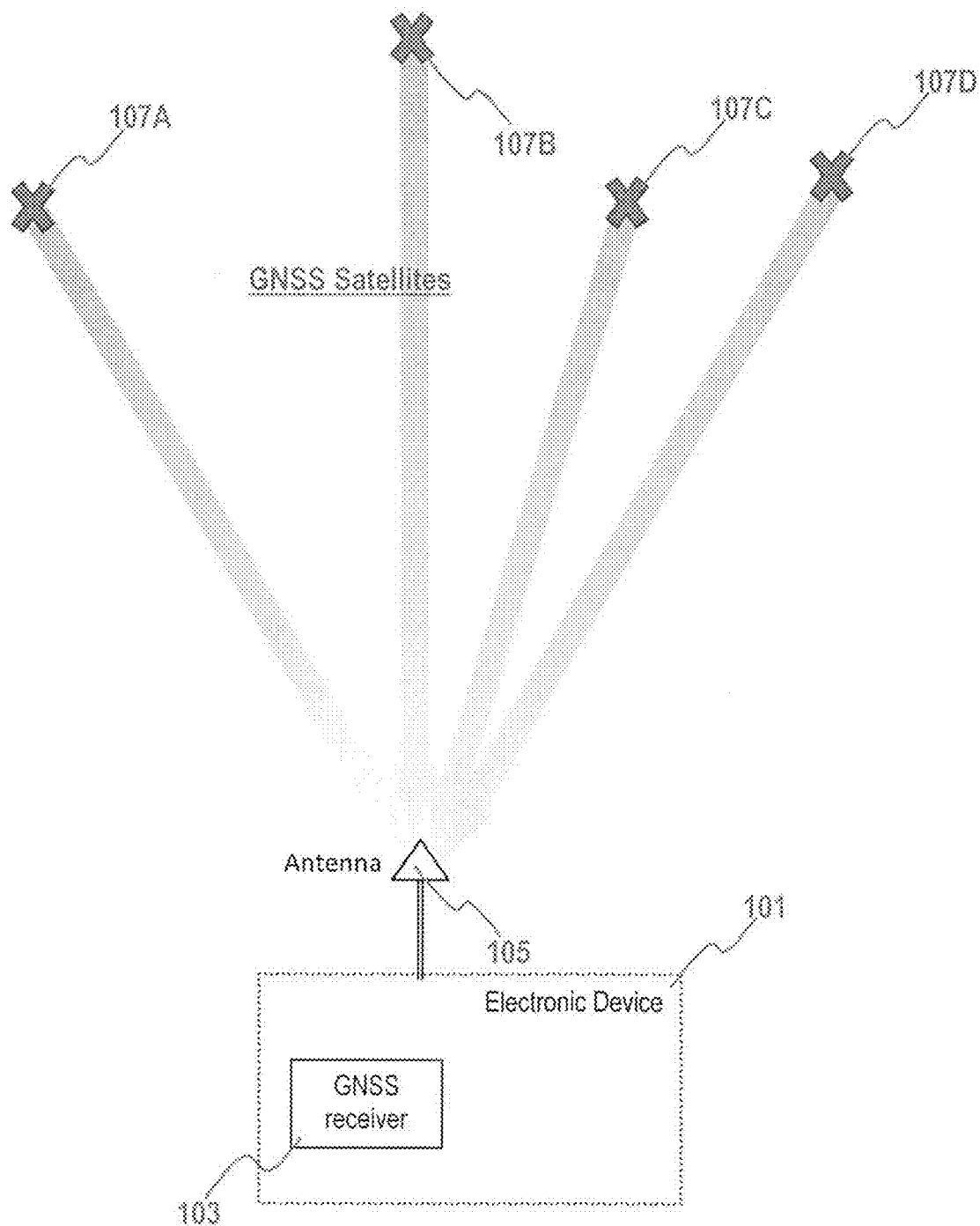
FIG. 1 is an exemplary block diagram of a GNSS receiver receiving GNSS signals, according to one embodiment.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although one embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

FIG. 1 is an exemplary block diagram of a GNSS receiver receiving GNSS signals, according to one embodiment.

Referring to FIG. 1, electronic device 101 includes GNSS receiver 103 and antenna 105, which is capable of receiving signals from GNSS satellites 107A, 107B, 107C, and 107D, which may be from one or more GNSS systems. The number of GNSS systems, both planned and presently operational, is growing. These include the widely-known, widely-used, and truly global global positioning system (GPS) of the United States, Russia's GLObalnaya NAvigatsionnaya Sputnikovaya Sistema (GLONASS), Europe's Galileo system, and China's BeiDou systems—each of which has, or will have, its own constellation of satellites orbiting the entire globe. Regional systems (those that are not global, but intended to cover only a certain region of the globe) include Japan's Quasi-zenith satellite system (QZSS) and the Indian regional navigational satellite system (IRNSS) also currently being developed. Satellite-based augmentation systems (SBASs), which are normally regional as well, "augment" existing GNSS systems with, e.g., messages from ground-based stations and/or additional navigational aids, are also continually developing and expanding.

On the receiving side, GNSS capabilities are no longer limited to any particular type of system or device. Electronic device 101 in which GNSS receiver 103 is implemented may be a mobile terminal, a tablet computer, a camera, a portable music player, and a myriad of other portable and/or mobile personal consumer devices, as well as integrated into larger devices and/or systems, such as the electronics of a vehicle. Moreover, multi-constellation GNSS receivers are being developed which receive signals from more than one satellite constellation (e.g., two or more of GPS, Galileo, GLONASS, BeiDou, regional systems, and/or augmentation system constellations) and provide much greater accuracy because the number of unblocked satellites, sometimes referred to as satellite/space vehicles (SVs), overhead at any time from several constellations is always greater than the number of SVs overhead from a single constellation.

The term "GNSS receiver" as used herein, covers any such implementation of GNSS capabilities in a device or system.

Although some of the description uses GPS signals as examples, the present disclosure is not limited thereto, and multiple other embodiments are possible, including, for example, embodiments using the BeiDou signal codes, the Galileo E1 signal codes, and/or the QZSS L1C signal codes. For more detailed descriptions of some, but not all, GNSS signals, including regional systems, to which embodiments of the present disclosure are applicable, see, e.g., Global positioning systems directorate systems engineering & integration—Interface specification IS-GPS-200H (Sep. 24, 2013), describing the GPS L1 C/A, L2C, and P channels/codes (hereinafter referred to generally as "IS-GPS-200"); Global positioning systems directorate systems engineering & integration—Interface specification IS-GPS-800D (Sep. 24, 2013), describing the GPS L1C channel/code (hereinafter referred to generally as "IS-GPS-800"); Global navigation satellite system—GLONASS—Interface control document—Navigational radio signal in bands L1, L2 (Edition 5.1) (2008) (hereinafter referred to generally as "GLONASS L1,L2 ICD"); European GNSS (Galileo) open service—Signal in space interface control document (version 1.3) (2016) (hereinafter referred to generally as "Galileo OS-SIS-ICD"); BeiDou navigation satellite system—Signal in space interface control document—Open service signal B1I (version 1.0) (December 2012) (hereinafter referred to generally as "BeiDou ICD"); Quasi-zenith satellite system—Interface specification—Satellite positioning, navigation and timing service (hereinafter referred to generally as "IS-QZSS-PNT-001"); and Indian regional navigation satellite system—Signal in space ICD for standard positioning service (version 1.1) (hereinafter referred to generally as "ISRO-IRNSS-ICD-SPS-1.1"), all of which are incorporated herein by reference in their entirety.

Moreover, embodiments of the present disclosure are equally applicable to GNSSs assisted or augmented by SBASs, such as wide area augmentation system (WAAS), European geostationary navigation overlay service (EGNOS), multi-functional satellite augmentation system (MSAS), GPS aided geo augmented navigation (GAGAN), and the "assisted" GNSS (A-GNSS) technology being developed for, e.g., measurement/testing of signals in cellular telecommunication systems (see $3^{rd}$ generation partnership project (3GPP) technical specification 3GPP TS 37.571: Universal terrestrial radio access (UTRA) and evolved UTRA (E-UTRA) and evolved packet core (EPC);

user equipment (UE) conformance specification for UE positioning, which has five parts, all of which are incorporated herein by reference).

Accordingly, one of ordinary skill in the art would recognize the applicability of the present disclosure to a variety of signals from any global or regional GNSS, whether augmented/assisted or not. Moreover, and as also would be understood by one of ordinary skill in the art, "channels," "bands," and "codes" may sometimes be used herein interchangeably, as many GNSS signals are transmitted on the same channel (i.e., same frequency, same time) or band (i.e., frequency bandwidth), but with different codes, which effectively makes them different "channels," in the more general sense of the term.

The present disclosure is generally related to GNSS receivers. In particular, the present disclosure is related to a system and method for improving GNSS receiver multipath mitigation by using pattern recognition.

Multipath mitigation describes methods that try to compensate for or cancel the effects of non-line of sight (NLOS) signals received by a GNSS receiver. Herein, "multipath mitigation" is sometimes used loosely to cover the mitigation of both the effects of multipath propagation, where the GNSS receiver receives both the "true" line of sight (LOS) signal and reflected NLOS signals (following different paths, i.e., multipath) from a satellite/SV, and the effects when the GNSS receiver receives only the NLOS signal(s) of a satellite, but not the actual LOS signal, which is commonplace in urban environments where the sides of "canyons" formed by tall buildings cause many NLOS signals from satellite that are not in direct view. See, e.g., Petrovello, M., *Multipath vs. NLOS signals: How does non-line-of-sight reception differ from multipath interference?* Inside GNSS, November-December 2013, pp. 40-44, which is incorporated by reference herein in its entirety.

Multipath/NLOS signals may significantly reduce the performance of GNSS receivers. See, e.g., Bhuiyan et al., *Multipath mitigation techniques for satellite-based positioning applications*, chapter 17, pp. 405-426, Global navigation satellite systems: signal, theory and applications, In; Jin, S., ed. (InTech: Rijeka, Croatia, 2012) (hereinafter referred to as "GNSSs: signal, theory and applications, chap. 17"), which is incorporated by reference herein in its entirety.

Thus, multipath signals are a dominant source of measurement error for a GNSS receiver when in a challenging environment such as an urban canyon.

Herein, the main measurements performed by GNSS receivers are referred to as range and range rate measurements.

According to one embodiment, the present system and method for multipath mitigation includes a pattern recognition/training stage and a pattern matching/use stage. In the pattern recognition/training stage, the present system/method sums correlations over a correlation delay window ($C_{window}$); performs data preprocessing on $C_{window}$ to remove noise terms and normalize correlation amplitude to generate $C_{used}$; and stores each processed $C_{used}$ and corresponding range error as a $C_{used}$/error range pair. In the pattern matching/use stage, the present system/method uses a sum of squares differences method to match a stored $C_{used}$ of a stored $C_{used}$/error range pair to a $C_{used}$ generated from a received GNSS signal to find the corresponding range error.

According to one embodiment, the present system and method uses the relationship between a correlation window pattern and a multipath induced range error to form an estimate of the range error for a given correlation window pattern. It is appreciated that although the present disclosure is described in relation to mitigating range measurement error, the present disclosure may be extended to delta range error without deviating from the scope of the present disclosure. The present system and method may use correlations observed in the frequency domain to mitigate delta range measurements.

Figure 2:
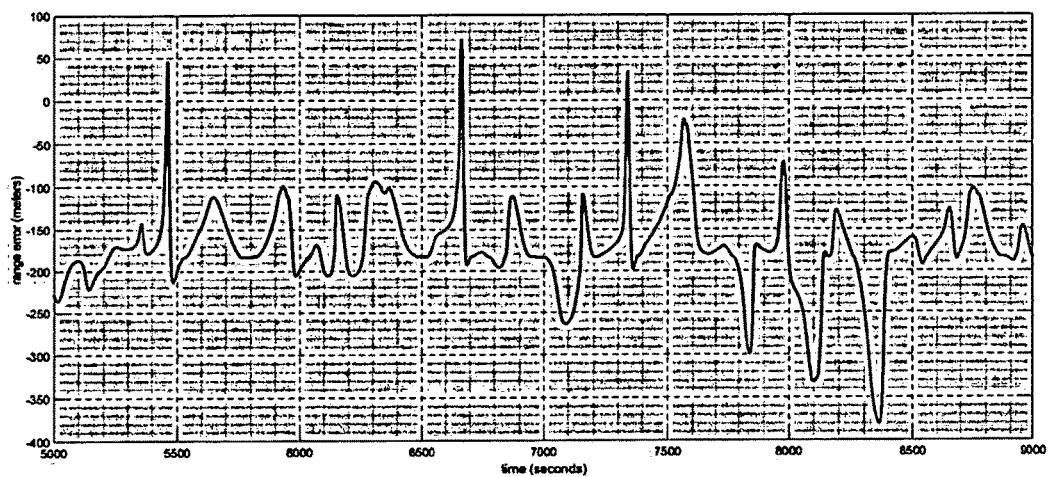
FIG. 2 illustrates an exemplary plot of range error (in meters) over time (in seconds) in an urban canyon environment, according to one embodiment.

FIG. 2 illustrates an exemplary plot of range error (in meters) over time (in seconds) in an urban canyon environment, according to one embodiment. Early side range errors are greater than zero meters and late side range errors are less than zero meters. Late side range errors are typically caused by delayed NLOS signals. Early side range errors are caused by distorted correlation waveforms—specifically, the effect distorted correlation waveforms have on the code tracking loops. Typically, there are more late side range errors than early side errors.

Figure 3:
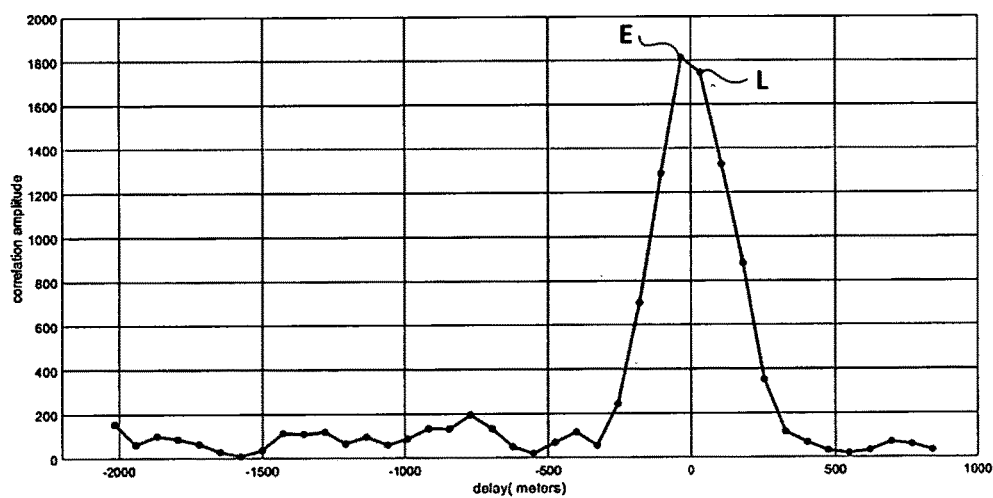
FIG. 3 illustrates an exemplary plot of a typical correlation function, according to one embodiment.
Figure 4:
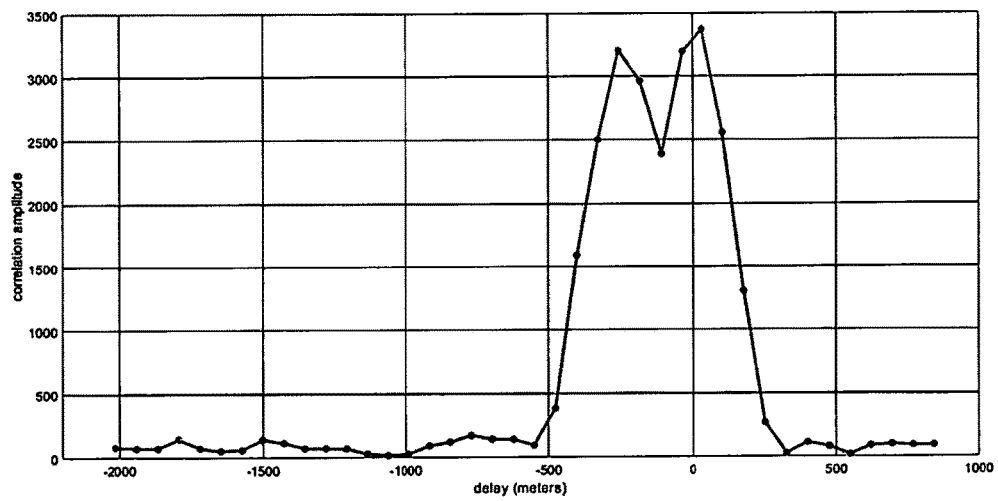
FIG. 4 illustrates an exemplary plot of a correlation window with multipath, according to one embodiment.

FIG. 3 illustrates an exemplary plot of a typical correlation function, according to one embodiment. In FIG. 3, the correlation function has 40 taps (shown by the 40 dots in FIG. 3), with the E (early) and L (late) taps, which are used to form code tracking loop discriminator, marked in the drawing. FIG. 4 illustrates an exemplary plot of a correlation window with multipath, according to one embodiment. The correlation window with multipath in FIG. 4 is significantly different than the correlation window without multipath in FIG. 3. Moreover, different types of multipath lead to different correlation patterns and subsequently different range errors.

Herein, a view/portion of a plot of a correlation function may be referred to as a "correlation window."

According to one embodiment of the present disclosure, there are two stages or phases: (1) pattern recognition, which is the training or learning stage, where correlation patterns/windows $C_{window}$s are recognized and pre-processed, associated with their corresponding range error, and stored together, referred to herein as a $C_{used}$ and range error pair, as discussed below in relation to FIGS. 5; and (2) pattern matching (while the GNSS receiver is being used), where the stored $C_{used}$ and range error pairs are used to determine range error by recognizing the corresponding pattern in a received GNSS signal, as discussed below in relation to FIG. 6.

Figure 5:
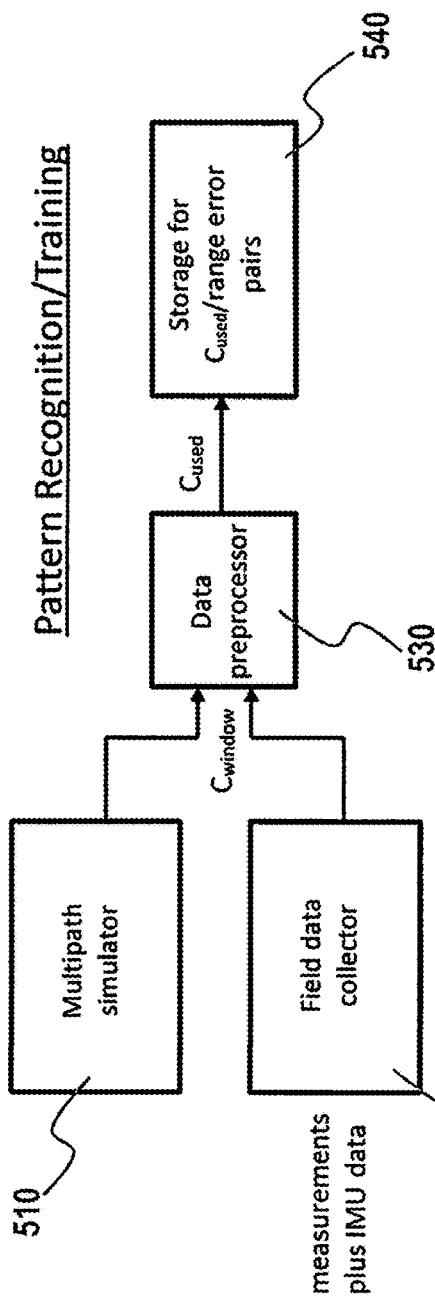
FIG. 5 illustrates an exemplary block diagram of a present system for generating $C_{used}$ and range error pairs (i.e., training), according to one embodiment.

FIG. 5 illustrates an exemplary block diagram of a present system for generating $C_{used}$ and range error pairs (i.e., training), according to one embodiment. The input data for generating $C_{used}$ and range error pairs may be either real-world data and/or simulated data. Hereinafter, a $C_{used}$ and range error pair may also be referred to as a "$C_{used}$/range error pair." In FIG. 5, both simulated data (provided by multipath simulator 510) and real world data (provided by field data collector 520) are used to generate the $C_{window}$s which, in turn, are used to create the $C_{used}$ and range error pairs.

Using multipath simulator 510, realistic multipath environments are simulated and GNSS signals are sent through them and received by a model of a GNSS receiver. The receiver model may include tracking loops. Multipath models may include the well-known Rician and Rayleigh fading models. The multipath model may be produced without Gaussian noise present (to model thermal noise for example). This reduces the uncertainty in the pattern matching when the $C_{used}$/range error pairs are used as in pattern matching, such as in FIG. 8. Although performing pattern matching includes the Gaussian noise present in the real world, the stored $C_{used}$/range error pairs need not be modelled using Gaussian noise. The simulated generation of multipath environments may include extensive different models, modelling indoor, benign (little multipath) and challenging outdoor environments. It is easier to generate many multipath models in simulation than it is to gather real world field data.

Using field data collector 520, real field data is logged in different environments. The overall technique relies on knowing the resulting range error, therefore an inertial measurement unit (IMU) can be used to supplement the GNSS receiver. The GNSS receiver provides $C_{window}$ and the corresponding range error is provided by using the measured range error of the GNSS receiver and the actual range generated by the IMU device. In practice, it is difficult and expensive to obtain an adequate sampling in comparison with computer modelling.

As shown in FIG. 5, the simulated and/or real world data samples are input as $C_{window}$ to data preprocessor 530.

Data preprocessing is used to remove the variation caused by different carrier to noise density $C/N_0$, also referred to as "CNO" herein, by removing the noise term using delay offset correlators. The data preprocessing also normalizes the maximum correlation amplitude to 1. The data preprocessing also allows other embodiments to use a shortened correlation window (e.g., from 40 to 28 correlation values). This is beneficial in focusing on the area of the correlation window where multipath is most likely to occur.

An example of data processing is discussed below in reference to FIGS. 7-9 and Equations (1)-(3).

Figure 7:
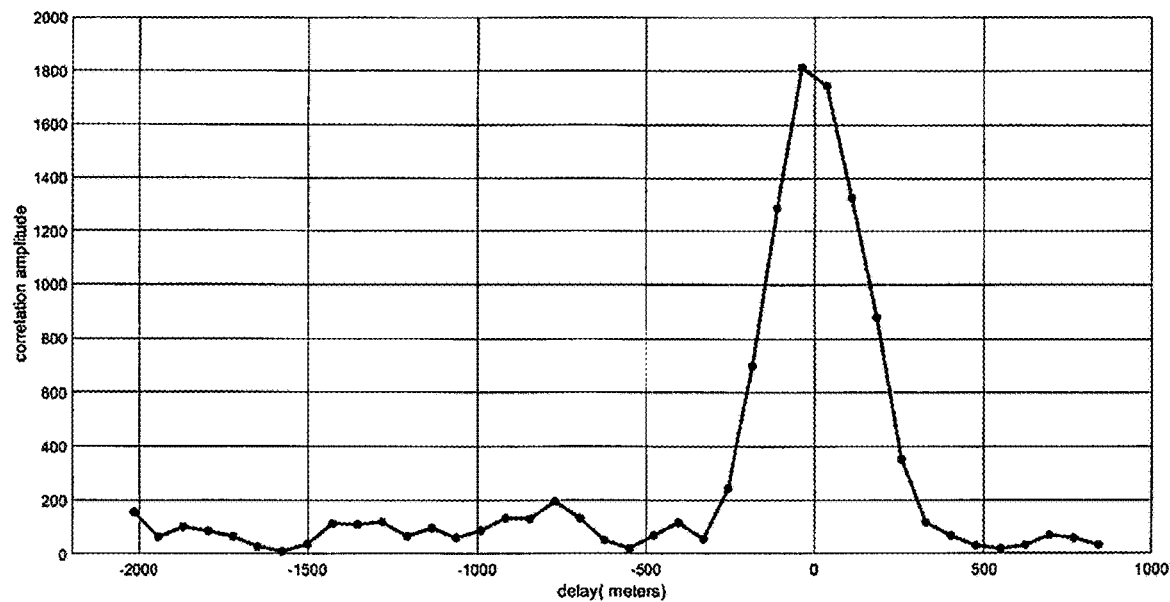
FIG. 7 illustrates a plot of an exemplary $C_{window}$ before preprocessing, according to one embodiment.

FIG. 7 illustrates a plot of an exemplary $C_{window}$ before preprocessing, according to one embodiment. In this embodiment, there are 40 correlator taps, and thus there are 40 dots in FIG. 7, meaning the correlation window is the whole function, i.e., it is not shortened. The $C_{window}$ in FIG. 7 may be designated as $C_{window}(1:40)$, indicating a correlation window of 40 correlation values, corresponding to 40 correlator taps.

In this embodiment, data preprocessing removes the mean expected noise as shown in Equation (1):

$$C_{minus\ noise}(1:40) = C_{window}(1:40) - \text{mean}[C_{window}(1:10)] \qquad (1)$$

where mean[$C_{window}(1:10)$] is used to represent the mean expected noise because only noise and no signal is expected at these taps/correlators which are far enough away from the expected received LOS and NLOS signals. This supplies an estimated mean noise energy which can be applied over the entire window. This does not delete the noise over the window, but rather makes the value of the mean of the noise over the window go to zero. Alternatively, the mean expected noise may be predetermined by knowing the expected AGC gain settings in the system. Before correlation the noise is normally larger than the GNSS signal so AGC is set on noise. In this case, the mean[$C_{window}(1:10)$] would be replaced by a constant in Equation (1).

Figure 8:
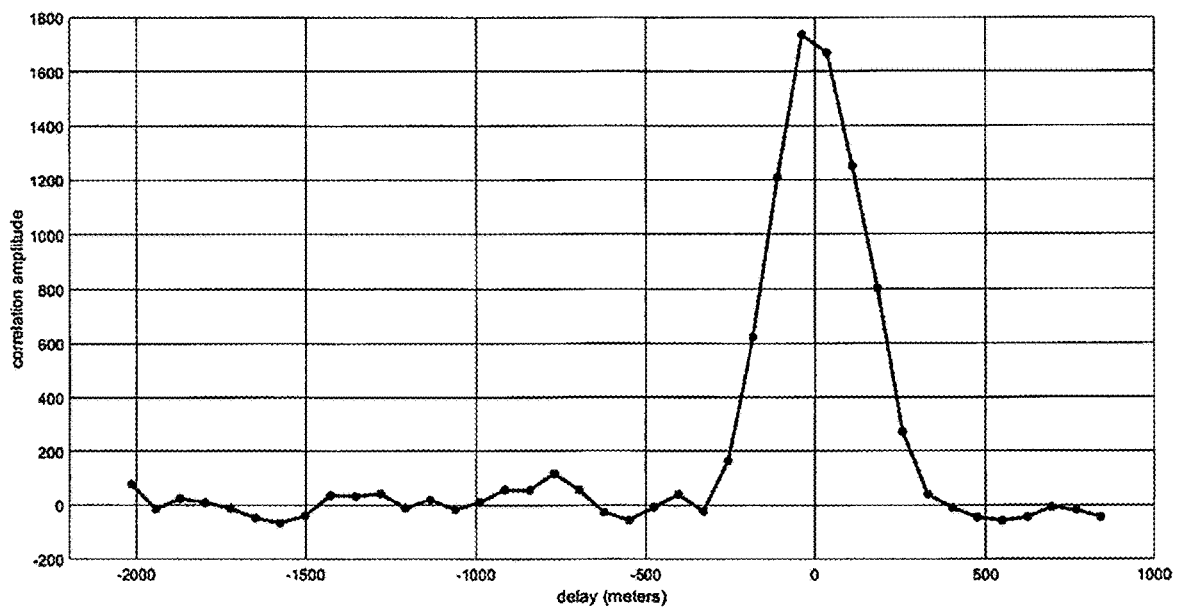
FIG. 8 illustrates a plot of an exemplary correlation window minus mean noise component ($C_{minus\_noise}$), according to one embodiment.

FIG. 8 illustrates a plot of the $C_{minus\ noise}(1:40)$ calculated in Equation (1), according to one embodiment.

Next, data preprocessing normalizes the amplitude to 1 by dividing all values in the correlation window by the maximum value, as shown in Equation (2):

$$C_{normalized}(1:40) = C_{minus\ noise}(1:40)/\max[C_{minus\ noise}] \qquad (2)$$

Figure 9:
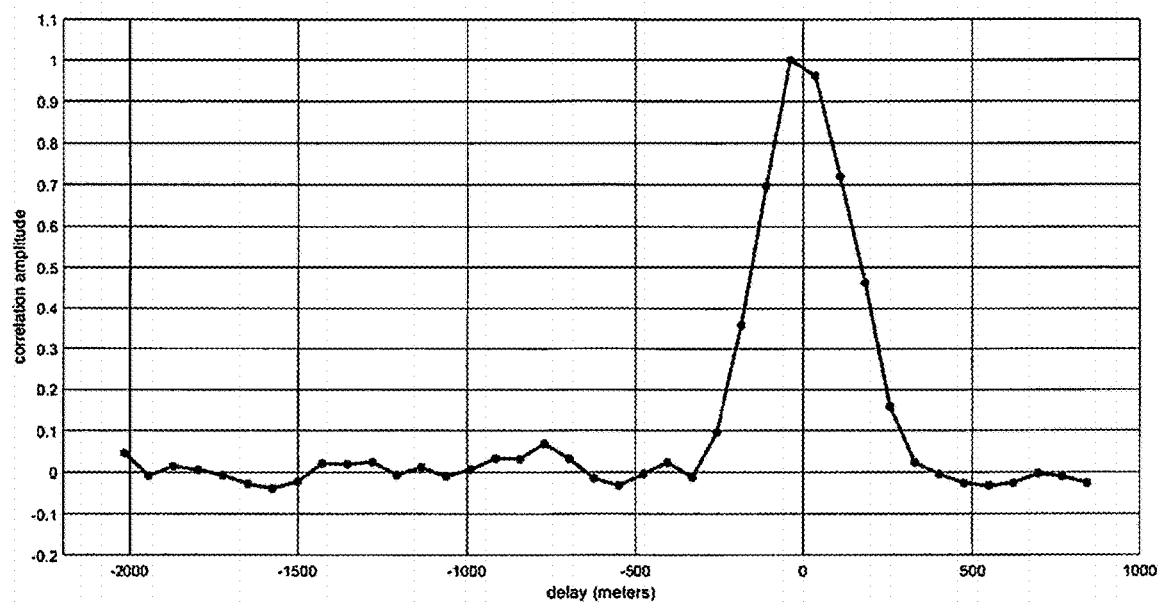
FIG. 9 illustrates a plot of an exemplary normalized correlation window without noise ($C_{normalized}$), according to one embodiment.

FIG. 9 illustrates a plot of the amplitude of the $C_{normalized}(1:40)$ calculated in Equation (2), according to one embodiment. After subtracting the mean expected noise, there is still noise present, but the mean of the remaining noise becomes zero. Hence, in FIG. 9, the correlators still "wiggle" with noise.

As discussed above, the correlation window may be shortened before storage, such as in the example of Equation (3) below:

$$C_{used}(1:28) = C_{normalized}(13:40) \qquad (3)$$

Figure 10:
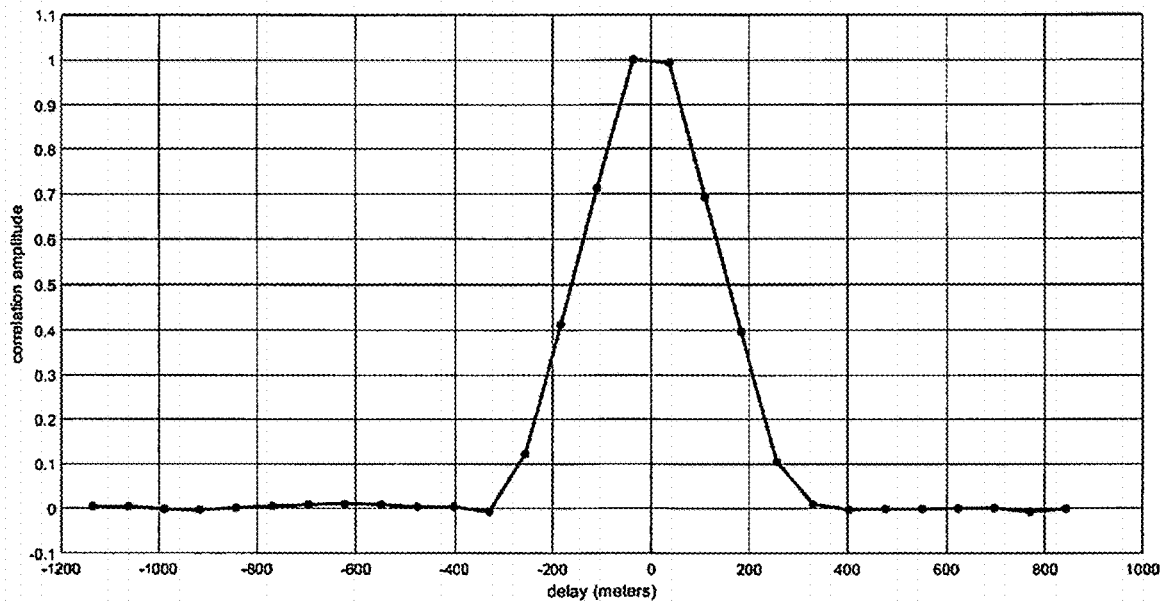
FIG. 10 illustrates a plot of an exemplary shortened normalized correlation window without noise ($C_{used}$), according to one embodiment

FIG. 10 illustrates a plot of $C_{used}$, i.e., the $C_{used}(1:28)$ calculated in Equation (3), according to one embodiment. As indicated in Equation (3), only the correlator taps from 13 to 40 in $C_{normalized}(1:40)$ in FIG. 9 are used to create the 28-tap $C_{used}(1:28)$ in FIG. 10. The correlation spacing is approximately ¼ chip or equivalently approximately 75 meters. The signal peak is 15.5 sample spacings from the left edge or 15.5*75=1.16 kms. This is enough delay to allow a LOS to be seen while tracking a NLOS. Typically, a UC multipath is observed to be less than 600 meters.

Returning to FIG. 5, the pairs of preprocessed $C_{used}$s output by data preprocessor 530 are stored with their corresponding error ranges in storage 540.

Figure 6:
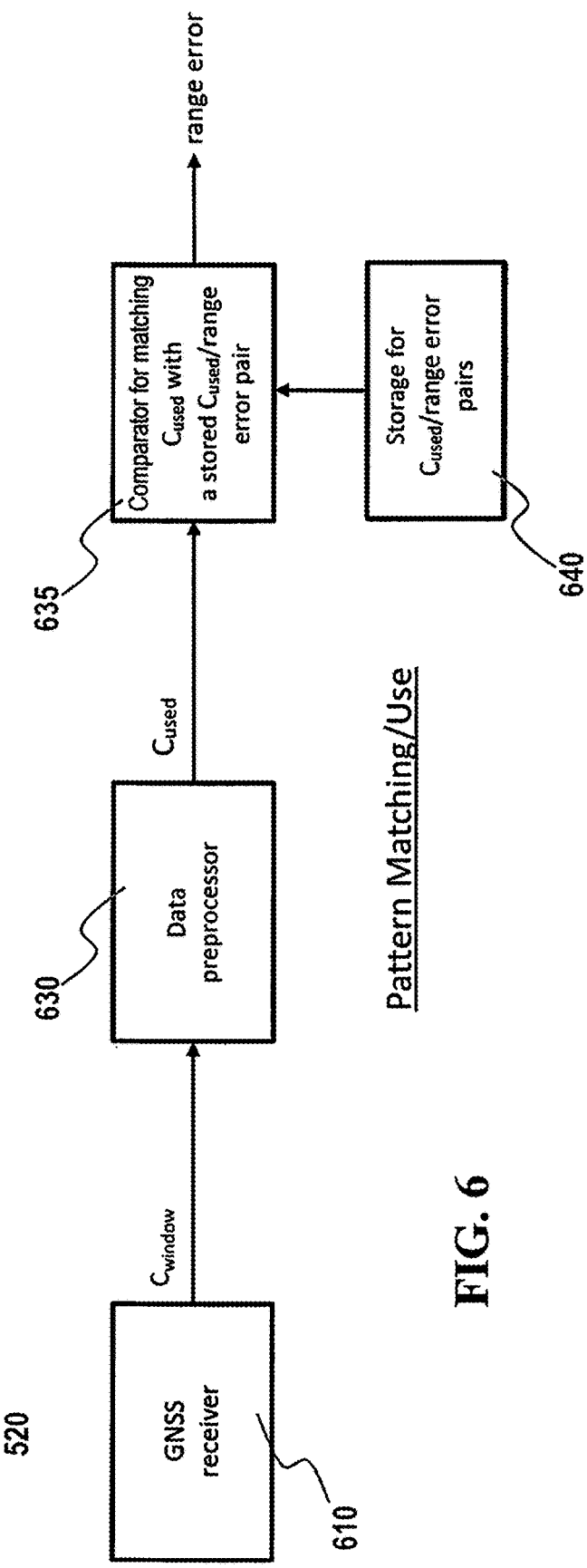
FIG. 6 illustrates an exemplary block diagram of a present system for pattern matching, using the stored $C_{used}$/range error pairs which may be generated as shown in FIG. 5, according to one embodiment.

FIG. 6 illustrates an exemplary block diagram of a present system for pattern matching, using the stored $C_{used}$/range error pairs which may be generated as shown in FIG. 5, according to one embodiment. GNSS receiver 10 receives GNSS signals and generates correlation patterns/windows $C_{window}$ which are input to data preprocessor 630. Data preprocessor performs the operations discussed above in relation to data preprocessor 530 in FIG. 5, FIGS. 7-9, and Equations (1)-(3). Data preprocessor 630 outputs $C_{used}$ to comparator 635. Comparator 635 matches each $C_{used}$ with a $C_{used}$ from the stored $C_{used}$/range error pairs in storage 640. There are different methods for doing this, some of which are discussed below. Based on the match, the range error corresponding to the matched stored $C_{used}$ is used to calculate a corrected range error, as shown in Equation (4):

$$\text{corrected range error} = \text{measured range} - \text{matching range error} \qquad (4)$$

Figure 11:
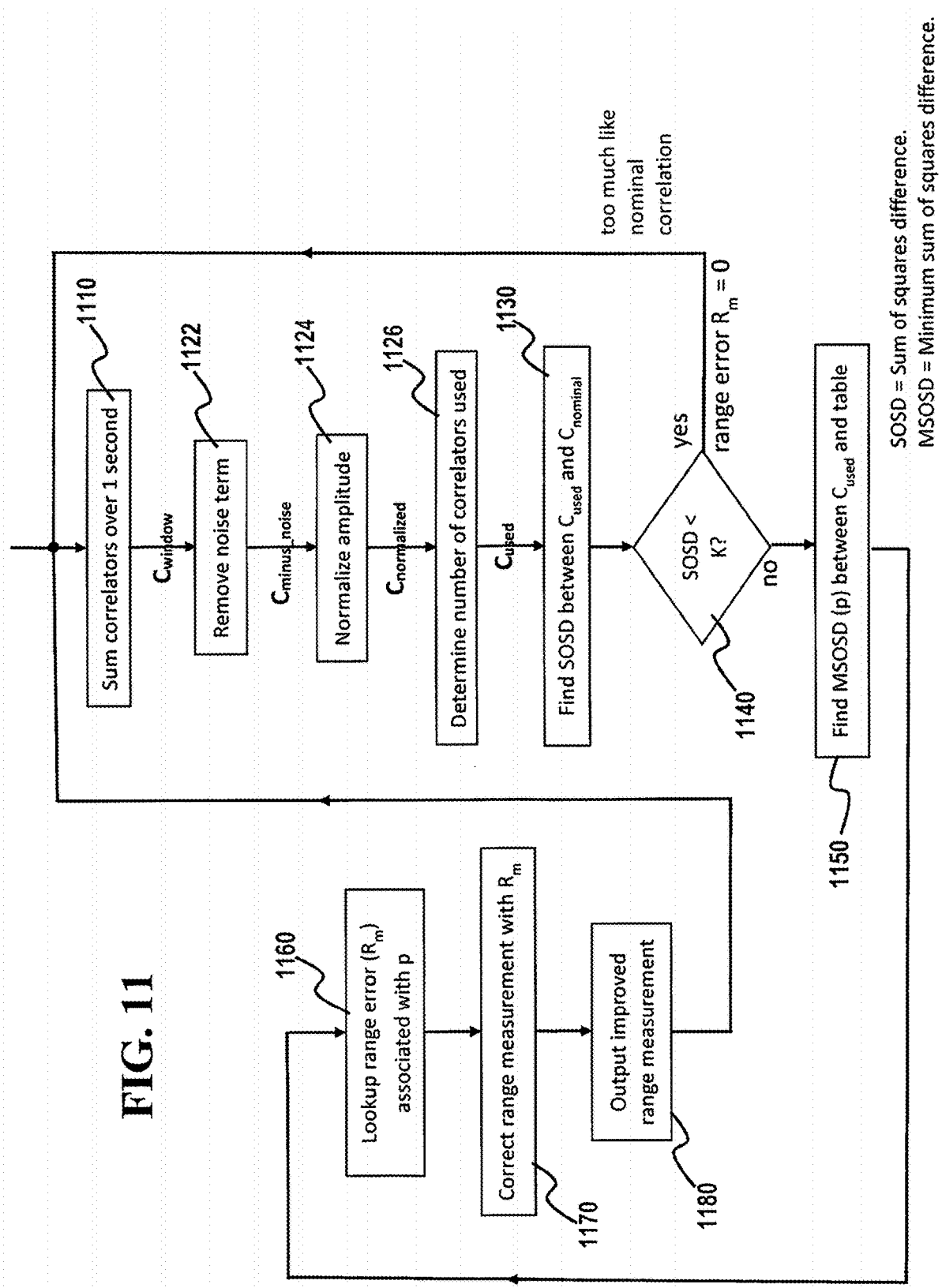
FIG. 11 illustrates an exemplary flow chart of the present system/method for correcting range error in a GNSS receiver by using pattern recognition, according to one embodiment.

FIG. 11 illustrates an exemplary flow chart of the present system/method for correcting range error in a GNSS receiver by using pattern recognition, according to one embodiment.

At 1110, the correlators are summed and averaged over 1 second to generate $C_{window}$.

At 1122-1126, the present system/method performs data preprocessing matching the data preprocessing performed during pattern recognition/training on $C_{window}$ to create $C_{used}$. Data preprocessing is required in order that the measured $C_{window}$ matches the stored $C_{used}$ in, for example, length in one embodiment where only 28 taps of the $C_{used}$s were stored in the $C_{used}$/range error pairs.

At 1122, the present system/method removes the noise term from $C_{window}$, such as discussed above in relation to Equation (1), leading to the output of $C_{minus\_noise}$, such as is shown in FIG. 8. At 1124, the present system/method normalizes the amplitude of $C_{minus\_noise}$ to generate $C_{normalized}$, such as discussed above in relation to Equation (2) and shown in FIG. 9. At 1126, the present system/method determines the number of correlators used for storing the stored $C_{used}$, such as discussed above in relation to Equation (3) and shown in FIG. 10, so as to generate a $C_{used}$ from $C_{normalized}$ of the same size as the stored $C_{used}$s. Accordingly, the present system/method outputs a measured/preprocessed $C_{used}$ at 1126.

Determining the number of correlators used in 1126 means the number of correlators used such as using a wide correlator window vs. using a correlator window that only includes expected multipath delay spread. Basically, $C_{used}$ is the correlation window stored in the table. The data processing steps (e.g., noise term removal at 1122) before arriving at the $C_{used}$ window is its characteristic for reducing the size of the table required. By removing mean noise and normalizing signal amplitude, many different satellite received CNOs are accounted for in a single step.

At 1130, the present system/method finds the sum of squares difference (SOSD) between the measured/preprocessed $C_{used}$ and $C_{nominal}$, which is a nominal correlation function (i.e., with no multipath and no noise). 1130 and 1140 are to prevent $C_{used}$ values that actually have no multipath showing large range error, i.e., false negatives. This may be caused by stored $C_{used}$s where only one NLOS is strong, which may be mistakenly matched with a measured $C_{used}$s where only the LOS is present (i.e., no multipath). To prevent this from happening, the present embodiment takes the SOSD of the measured/preprocessed $C_{used}$ and $C_{nominal}$ at 1130, and then determines whether the SOSD is less than a given threshold, K, at 1140. If the SOSD is below the given threshold K at 1140, then the matching range error is set to zero before looping back to the beginning. If the SOSD is greater than or equal to the given threshold K at 1140, then the present system/method proceeds to 1150. In other embodiments, the present system may use time difference methodology to catch such nominal correlation errors.

At 1150, the present system/method finds the minimum SOSD (MSOSD) between the measured/preprocessed $C_{used}$ and the stored $C_{used}$s in the table. More exactly, the present system/method first performs SOSD between the measured/preprocessed $C_{used}$ and the stored $C_{used}$s as shown in Equation (5):

$$S_{1,\ldots,M} = \Sigma_{1\ldots N}(P_{i,n} - C_n)^2 \quad (5)$$

where N is the number of correlators, n is the index for the correlators, M is the number of stored $C_{used}$s, and i is the index for the stored $C_{used}$s. Thus, $C_n$ is the value of the nth correlator and $P_{i,n}$ is the value of the corresponding nth correlator in the ith stored $C_{used}$ (or pattern). The typical value for M may be, for example, 100,000 or 1,000,000, as not all possibilities need to be searched. The present system/method then selects the pattern P (stored $C_{used}$) with the minimum summation as shown in Equation (6):

$$\text{MSOSD}(P) = \min(S_{1,\ldots,M}) \quad (6)$$

At 1160, the present system/method finds the range error ($R_m$) corresponding to the selected pattern P/stored $C_{used}$, which is used to correct the range measurement in 1170. The corrected range measurement is output in 1180.

According to the present disclosure, the storage for the stored $C_{used}$s tables may be stored in the GNSS receiver, in the electronic device of which the GNSS receiver is a component, over a network, or from the cloud. Moreover, the stored $C_{used}$s tables may be updated/modified. In another embodiment, the system/method applies a threshold to MSOSD(P) in order to guarantee a minimum matched range error.

Tests and simulations involving the present methods, systems, and apparatuses are detailed in U.S. Provisional Patent Application Ser. No. 62/633,760 filed on Feb. 22, 2018, from which the present application claims priority and which is incorporated by reference in its entirety.

Figure 12:
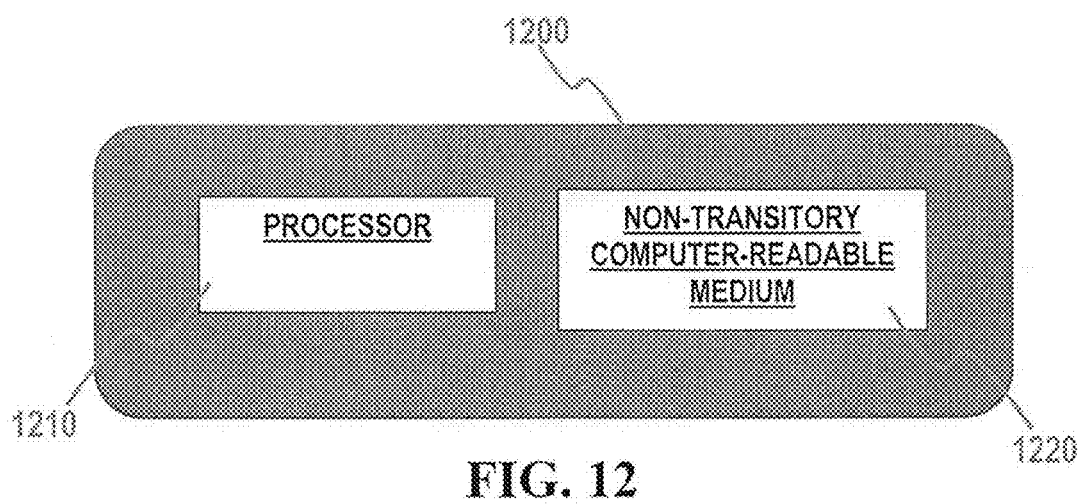
FIG. 12 illustrates an exemplary diagram of the present apparatus, according to one embodiment.

FIG. 12 illustrates an exemplary diagram of the present apparatus, according to one embodiment. An apparatus 1200 includes at least one processor 1210 and one or more non-transitory computer readable media 1220. The at least one processor 1210, when executing instructions stored on the one or more non-transitory computer readable media 1220, performs the steps of summing correlations of received GNSS signals over time to generate a correlation window ($C_{window}$); preprocessing the generated $C_{window}$ to generate $C_{used}$; comparing the generated $C_{used}$ with a plurality of stored $C_{used}$s, where each of the plurality of stored $C_{window}$s is stored with a corresponding range error; and using the stored range error corresponding to the matching stored $C_{used}$ to improve a range measurement.

Moreover, the one or more non-transitory computer-readable media 1220 stores instructions for the at least one processor 1210 to perform those steps.

Figure 13:
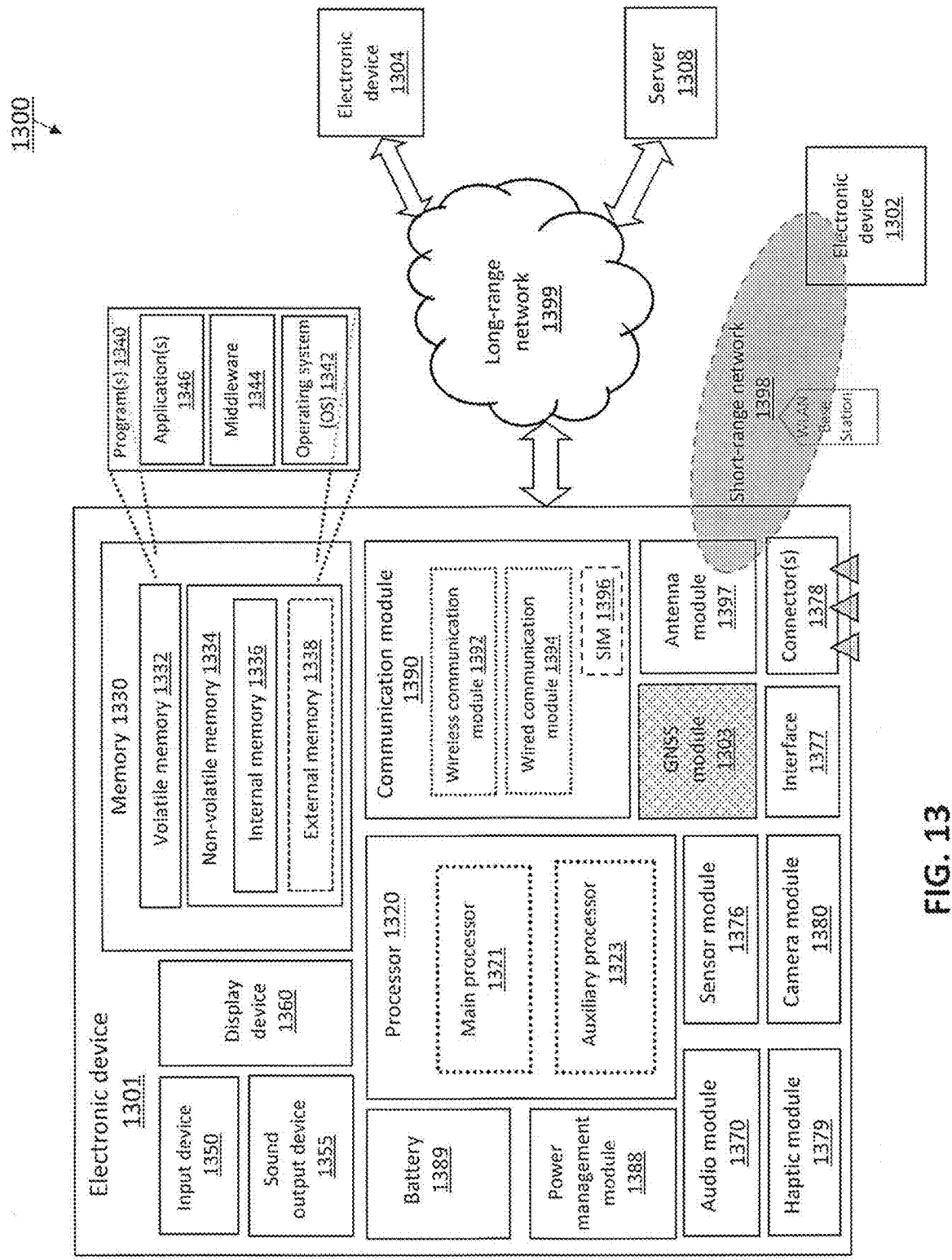
FIG. 13 illustrates an exemplary block diagram of an electronic device 1301 in a network environment 1300, according to one embodiment.

FIG. 13 is an exemplary block diagram of an electronic device 1301 in a network environment 1300, according to one embodiment. Electronic device 1301 according to one embodiment may be, for example, a portable communication device (e.g., a smart phone), a computer, a portable multimedia device, a portable medical device, a camera, a wearable device, or a home appliance. However, this is a list of examples, and an electronic device according to the present disclosure is not limited to any of those listed and/or described herein.

Referring to FIG. 13, electronic device 1301 in network environment 1300 may communicate with an external electronic device 1302 via short-range wireless communication network 1398 (or "first network"), or communicate with another external electronic device 1304 or a server 1308 via a long-range wireless communication network 1399 (or "second network"). According to one embodiment, electronic device 1301 may communicate with electronic device 1304 via server 1308. Each of electronic devices 1302 and 1304 may be different or the same type of device as electronic device 1301. According to one embodiment, all or some of the operations described herein may be executed at one or more external devices/systems (e.g., external electronic devices 1302 and 1304, or server 1308) rather than being executed by electronic device 1301. For example, electronic device 1301 may request one or more external devices/systems to perform at least part of a function or a service being performed/executed. The one or more external devices/systems receiving the request would transfer the suitable/appropriate outcome of performing at least part of a function or a service to the electronic device 1301. In this regard, cloud computing, distributed computing, and/or client-server computing technology may be used, for example, with electronic device 1301.

Electronic device 1301 includes processor 1320, memory 1330, input device 1350, sound output device 1355, display device 1360, audio module 1370, sensor module 1376, interface 1377, haptic module 1379, camera module 1380, power management module 1388, battery 1389, communication module 1390, GNSS module 1303, and antenna module 1397. In one embodiment, one or more components (e.g., haptic module 1379 or camera module 1380) may be omitted from, or one or more other components may be added to, electronic device 1301. In one embodiment, some of the components may be implemented as a single integrated circuit (IC). For example, the sensor module 1376 (e.g., a fingerprint sensor, an iris sensor, or an illuminance sensor) may be embedded in the display device 1360 (e.g., a display screen).

Electronic device 1301 has one or more internal communication and/or power transmission systems to which the one or more components in electronic device 1301 are connected for inter-component communication and/or power reception/transmission. Such systems allow the one or more components to communicate data and commands amongst themselves, as well as to provide timing, power, and other signals. Such a system may be implemented via an inter-peripheral communication scheme, such as, e.g., a bus, a general purpose input and output (GPIO), a serial peripheral interface (SPI), a mobile industry processor interface (MIPI), and/or the like, as would be understood by one of ordinary skill in the art.

Processor 1320 executes software (e.g., program 1340) to, for example, control one or more hardware/software components of the electronic device 1301, or perform various data processing or computations. As at least part of the data processing or computations, processor 1320 may, for example, load a command or data received from a component of the electronic device 1301 (e.g., sensor module 1376 or communication module 1390) in volatile memory 1332, process/execute the command or the data stored in the volatile memory 1332, and store the result in non-volatile memory 1334. Processor 1320 includes a main processor 1321 (which may include, e.g., a central processing unit (CPU) and/or an application processor (AP)), and an auxiliary processor 1323 (which may include, e.g., a graphics processing unit (GPU) and/or an image signal processor (ISP). In this embodiment, auxiliary processor 1323 is implemented separately from main processor 1321, and may be operable independently from, or in conjunction with, main processor 1321. Auxiliary processor 1323 may be adapted to consume less power than main processor 1321, to execute one or more particular functions, and/or to be a part of main processor 1321. Additionally or alternatively, main processor 1321 and/or auxiliary processor 1323 may include a sensor hub processor, a communication processor (CP), or the like.

Auxiliary processor 1323 may control at least some of the functions or states related to one or more components of the electronic device 1301 (e.g., display device 1360, sensor module 1376, and/or communication module 1390) while main processor 1321 is in an inactive state (e.g., sleep). Additionally or alternatively, auxiliary processor 1323 may control at least some of the functions or states related to one or more components of the electronic device 1301 together with main processor 1321 while the main processor 1321 is in an active state (such as, e.g., executing an application). Depending on the embodiment, one or more processors (such as, e.g., an image signal processor or a communication processor) and/or processor functions may be implemented as part of one or more components of the electronic device 1301 (such as, e.g., camera module 1380 and/or communication module 1390).

Memory 1330 stores data, for examples, generated by and/or used by one or more components of the electronic device 1301 (such as, e.g., processor 1320 or sensor module 1376). Such stored data may include, for example, software/executable instructions (e.g., program(s) 1340), input data, output data, operating parameters/instructions, and the like, as would be understood by one of ordinary skill in the art. In this embodiment, memory 1330 includes volatile memory 1332 and non-volatile memory 1334.

Program(s) 1340 stored in memory 1330 includes operating system (OS) 1342, middleware 1344, and application(s) 1436, as discussed further below in reference to FIG. 14.

Input device 1350 receives external commands or data (such as from, e.g., a user) to be used by one or more components of the electronic device 1301 (such as, e.g., processor 1320). The input device 1350 may include, for example, a microphone, a mouse, and/or a keyboard.

Sound output device 1355 outputs sound signals and may include, for example, one or more speakers that may be used for general purposes, such as playing multimedia or recording, as well as for providing the audio component of a call. According to one embodiment, the audio component of a call may be provided by a separate component and/or only partially by the speaker of sound output device 1355.

Display device 1360 provides images/video by means of, for example, one or more of a display screen, a touch screen, a hologram device, or a projector, and includes control circuitry to control the one or more of the display screen, touch screen, hologram device, or projector. According to one embodiment with a display touchscreen, the display device 1360 may include touch circuitry/sensor circuitry (e.g., a pressure sensor) adapted to detect a contact/touch/hover and/or to measure the force, trajectory, speed, relative movement in 3D space, etc., of such a detected contact/touch/hover.

Audio module 1370 converts sound into electrical signals and vice versa. Depending on the embodiment, audio module 1370 may obtain sound via input device 1350, output sound via sound output device 1355, input/output sound via headphones connected by wire to connector(s) 1378 of the electronic device 1301, input/output sound via headphones wirelessly connected to the electronic device 1301, and/or input/output sound via an external electronic device (e.g., electronic device 1302) connected by wire or wirelessly with the electronic device 1301.

Sensor module 1376 detects an environmental state (including, e.g., a state of a user) external to the electronic device 1301, and/or an operational state (e.g., power or temperature) of the electronic device 1301 and then generates an electrical signal/data value corresponding to the detected state. Sensor module 1736 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

Interface 1377 supports one or more interface/communication protocols for the electronic device 1301 to interface/communicate with a wide variety of external electronic devices. According to one embodiment, interface 1377 supports, for example, a high definition multimedia interface (HDMI), a universal serial bus (USB) interface, a secure digital (SD) card interface, an audio-based interface, a radio-based interface, and/or the like, as would be understood by one of ordinary skill in the art. Connector(s) 1378 include one or more physical connectors by which one or more external devices/objects may be physically connected with the electronic device 1301. Connector(s) 1378 may include, for example, one or more of an HDMI input, a USB input, an SD card input, an audio jack, an Ethernet plug, and/or the like, as would be understood by one of ordinary skill in the art.

Haptic module 1379 converts an electrical signal into mechanical vibration/movement to generate a tactile sensation or kinesthetic sensation for anyone holding electronic device 1301. Haptic module 1379 may include, for example, a motor, a piezoelectric element, and/or an electrical stimulator.

Camera module 1380 captures still and/or moving images/videos. Camera module 1380 may include and/or be connected with lenses, image sensors, image signal processors, lighting devices (such as flashes or light diodes), image generators for the user to see/aim the camera, and/or other circuitry, as would be well-known to one of ordinary skill in the art of implementing a photographing capability in a portable device.

Power management module 1388 manages at least one of the power input/supplied to the electronic device 1301, battery 1389, and/or the power distributed among one or more components of the electronic device 1301. Power management module 1388 may be implemented as at least part of, for example, a power management integrated circuit (PMIC). Battery 1389 may supply power to one or more components of the electronic device 1301 and may be partly or fully under control of power management module 1388. Battery 1389 may include, for example, at least one of a primary cell which is not rechargeable, a secondary cell which is rechargeable, or a fuel cell.

Communication module 1390 supports wireless communication through wireless communication module 1392 and wired communication through wired communication module 1394. For example, communication module 1390 may establish a direct communication channel between the electronic device 1301 and an external electronic device (via a wired connection using wired communication module 1394 and connector(s) 1378) and/or establish a wireless communication channel between the electronic device 1301 and the same or another external electronic device (via a wireless connection using wireless communication module 1392 and, for example, antenna module 1397). Communication module 1390 may include one or more communication processors that are operable independently from processor 1320 and are for establishing and/or maintaining wired and/or wireless communication.

Wireless communication module 1392 supports at least one of long-range wireless communication (such as, e.g., cellular network communication, wide area network (WAN) communication, and/or any other long- to mid-range communication) and short-range wireless communication (such as, e.g., near field communication (NFC), Bluetooth™, wireless LAN (WLAN) communication under any IEEE 802.11 or 802.15 standard, wireless-fidelity (Wi-Fi), infrared communication under an Infrared Data Association (IrDA) standard, ZigBEE™ and/or any other proprietary short-range communication standards, and/or any other short- to mid-range communication).

Wired communication module 1394 supports any practicable wired communication, as would be understood by one of ordinary skill in the art, such as, e.g., power line communication (PLC), Ethernet communication such as those under any IEEE 802.3 standard, optical internetworking, connecting with the Internet, and/or any other communication/networking using any sort of wire capable of carrying a signal or wired connector. Communication module 190 may be implemented as a single component (e.g., a single IC), or may be implemented as multiple components/ICs (such as, e.g., the wireless communication module 1392 and wired communication module 1394) that are separate from each other.

Communication module 1390 uses subscriber information (e.g., international mobile subscriber identity (IMSI)) stored in subscriber identification module (SIM) 1396 to identify and authenticate electronic device 1301 to a telecommunication network.

Antenna module 1397 may transmit or receive a signal and/or power to or from the outside of the electronic device 1301. Antenna module 1397 may include a plurality of antennas, where different subsets of the plurality of antennas are appropriate/suitable for each of the different antenna-based communication schemes/networks/protocols supported by communication module 1390.

GNSS module 1303 receives and processes signals from satellites from one or more GNSSs. Broadly speaking, the reception/processing of GNSS signals involves three phases: acquisition, tracking, and positional calculation, resulting in a "navigation solution"/PVT/PNT. The present location of any satellites, or Space Vehicles (SVs), in view is estimated based on the GNSS receiver's location, the time, and previously stored information concerning the orbits of the SVs in view from one or more GNSS constellations. The resulting estimated azimuth and elevation coordinates for each SV is then used to "acquire" the actual rough locations of (at least some of) the SVs using the GNSS signals presently being received. Generally, acquisition involves (1) detecting each SV signal in code delay (in most GNSS systems, each SV has its own CDMA code) and Doppler frequency; and (2) determining the rough code delay and Doppler frequency (and position) of any detected SV's. The two dimensions of code delay and Doppler frequency are often referred to as the acquisition search space.

Using the coarse data—code delay, Doppler frequency, and position—from acquisition, the received GNSS signals are fine-tuned, or more specifically "tracked" using loops, typically a delay lock loop (DLL) and a phase lock loop (PLL). Once a certain level of tracking precision is met, the data embedded in the GNSS signal can finally be decoded and used to calculate the position, velocity, and/or exact time of the present location of the GNSS receiver. These calculations are fed back into the process, thereby creating a constantly repeating loop of estimating, selecting, tracking, calculating, and updating.

Figure 14:
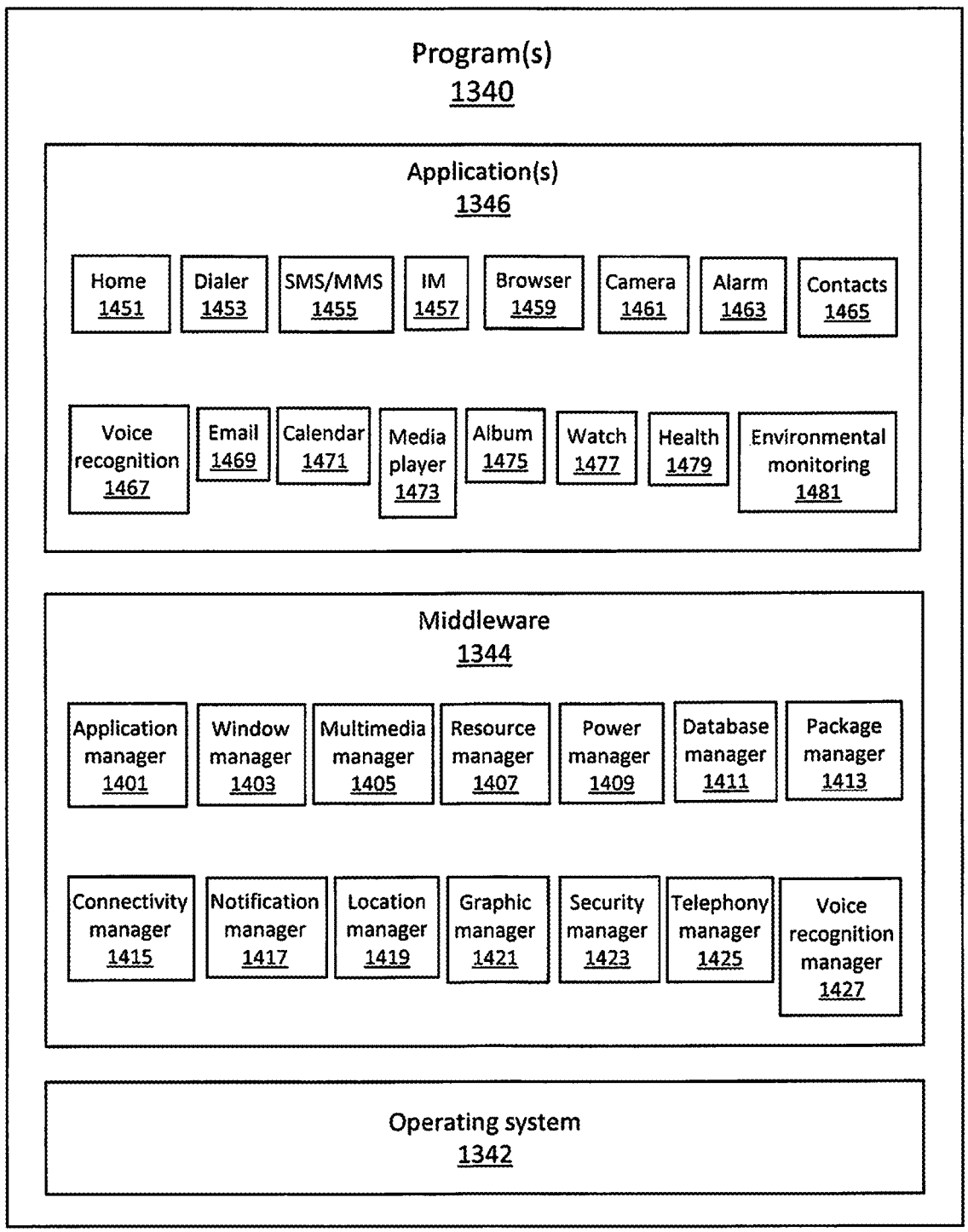
FIG. 14 illustrates an exemplary block diagram of program(s) 1340 from electronic device 1301 in FIG. 13, according to one embodiment.

FIG. 14 illustrates an exemplary block diagram of program(s) 1340 from electronic device 1301 in FIG. 13, according to one embodiment. Program(s), application(s), and other such terms may be used herein in the singular form for convenience of explanation, and are not intended as limiting in any sense.

Referring to FIG. 14, program 1340 includes at least one executable application 1346, middleware 1344, and at least one operating system (OS) 1342 to control one or more resources of electronic device 1301. OS 1342 may be any of, for example, Android®, iOS®, Windows®, Symbian®, Tizen®, or Bada™. At least part of program 1340 may be pre-loaded on electronic device 1301 during/after manufacture and/or may be downloaded from or updated by electronic device 1301 connecting to an external system/device (e.g., the electronic device 1302 or 1304, or the server 1308) before/during use.

OS 1342 controls management of one or more system resources (e.g., allocating, modifying, or deallocating processes, memory, and/or power) of electronic device 1301. Additionally or alternatively, OS 1342 may include one or more driver programs to drive components within (or connected to) electronic device 1301. For example, OS 1342 may have drivers for one or more of input device 1350, sound output device 1355, display device 1360, audio module 1370, sensor module 1376, interface 1377, haptic module 1379, camera module 1380, power management module 1388, battery 1389, communication module 1390, the subscriber identification module 1396, or antenna module 1397.

Middleware 1344 provides various functions to application 1346 such that a function or information provided from one or more resources of electronic device 1301 may be used by application 1346. Middleware 1344 includes application manager 1401, window manager 1403, multimedia manager 1405, resource manager 1407, power manager 1409, database manager 1411, package manager 1413, connectivity manager 1415, notification manager 1417, location manager 1419, graphic manager 1421, security manager 1423, telephony manager 1425, and voice recognition manager 1427.

Application manager 1401 manages the life cycle of application(s) 1346. Window manager 1403 manages one or more graphical user interface (GUI) resources that are used on a display screen. Multimedia manager 1405 identifies the format appropriate to access/play a media file, and selects a codec appropriate for the identified format to encode/decode the media file. Resource manager 1407 manages source code of application(s) 1346 and/or the memory space of memory 1330. Power manager 1409 manages/monitors the capacity, temperature, and/or power of battery 1389, and/or determines/provides power-related information to be used for the operations of electronic device 1301. According to one embodiment, power manager 1409 may interoperate with a basic input/output system (BIOS) of electronic device 1301.

Database manager 1411 generates, searches, manages, monitors, and/or modifies one or more databases which, for example, may be used by application(s) 1346. Package manager 1413 manages the installation and/or updates of any application or updates that are distributed in the form of a package file. Connectivity manager 1415 manages communication connections between electronic device 1301 and any external network/system/device. Notification manager 1417 notifies the user of the occurrence of an event (e.g., an incoming call, message, or alert). Location manager 1419 manages/monitors/distributes locational information on electronic device 1301. Graphic manager 1421 manages graphic effects to be shown on display device 1360 or other visual display.

Security manager 1423 provides system security and/or user authentication. Telephony manager 1425 manages voice/video call functions provided by electronic device 1301. Voice recognition manager 1427 provides a voice recognition and/or voice-to-text function. For example, voice recognition manager 1427 may transmit a user's voice data to server 1308, and receive, from server 1308, a command corresponding to a function to be executed on electronic device 1301 based at least in part on the voice data, or text data converted based at least in part on the voice data.

Middleware 1344, as would be understood by one of ordinary skill in the art, may turn on/off, alter/modify, delete, and/or add managers/components. At least a part of middleware 1344 may be implemented as part of OS 1342. As would be understood by one of ordinary skill in the art, middleware 1344 may include more, less, or different managers/components than those listed here.

Application(s) 1346 include home application 1451, dialer application 1453, short message service (SMS)/multimedia messaging service (MMS) application 1455, instant messaging (IM) application 1457, browser application 1459, camera application 1461, alarm application 1463, contacts application 1465, voice recognition application 1467, email application 1469, calendar application 1471, media player application 1473, album application 1475, watch application 1477, health application 1479 (e.g., for measuring the degree of workout or biometric information, such as blood sugar, of a user), and environmental monitoring application 1481 (e.g., for measuring atmospheric pressure, humidity, or temperature information).

According to one embodiment, application 1346 may further include, for example, an information exchange application and/or a device management application. The information exchange application supports information exchange between electronic device 1301 and external devices/systems/networks. The information exchange application, for example, may include a notification relay function adapted to transfer designated information/notifications corresponding to an occurrence of an event (e.g., an alert, receipt of an email, a call, an IM message, etc.) to an external electronic device currently being used by the user. Additionally or alternatively, the notification relay function may receive notification information from the external electronic device and provide the notification information to a user of electronic device 1301. The device management application would manage one or more external devices/systems. For example, the device management application may control the power (e.g., turn-on or turn-off) and one or more functions of external devices/systems (e.g., the adjustment of brightness, resolution, or focus of a camera wirelessly connected to electronic device 1301). Additionally or alternatively, the device management application may support the installation, updating, and/or deletion of one or more functions/applications on one or more external devices/systems.

The steps and/or operations described above in relation to one embodiment may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software. More specifically, depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof.

A "processor" as used herein refers to any device configured to perform one or more operations based on instructions, including, but not limited to, any general purpose processor in communication with a storage medium from which computer-readable instructions can be retrieved, any special-purpose processor configured to execute specific types of instructions (such as a Digital Signal Processor (DSP)), any special-purpose processor where some or all of the instructions are hard-wired into the actual processor design, any combination thereof, and/or any other type of processor. A processor as used herein may take any form, from a simple micro-controller to a completely self-contained computing system having a bus, memory controller, cache, etc., to a group or cluster of computing devices networked together to provide greater processing capability (e.g., distributed computing). A processor as used herein may have one or more cores, and a multi-core processor used to implement one embodiment of the present disclosure may be symmetric or asymmetric. A processor as used herein may include, without limitation, one or more ASICs, standard integrated circuits, controllers executing appropriate instructions, and including microcontrollers and/or embedded controllers, FPGAs, CPLDs, microprocessors, and the like.

The term "non-transitory computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, EEPROM, any other memory chip or cartridge, or any other medium on which instructions which can be executed by a processor are stored.

Thus, methods according to embodiments of the present disclosure may be implemented by devices constructed to perform the operations (such as hardware circuits), or implemented as programs and/or higher-level instructions to be provided to one or more processors for performance/implementation (such as instructions stored in a non-transitory memory), and/or that includes machine-level instructions stored in, e.g., firmware or non-volatile memory. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Accordingly, embodiments of the present disclosure may be implemented in a wide variety of computing architectures and environments, as would be understood by one of ordinary skill in the art. One or more logical operations of embodiments of the present disclosure may be implemented as: (1) a sequence of computer implemented steps, operations, or procedures running on one or more general use programmable circuits, (2) a sequence of computer implemented steps, operations, or procedures running on one or more specific-use programmable circuits; and/or (3) interconnected machine modules or program engines within one or more general use and/or specific-use programmable circuits. One or more processors used to perform one or more steps and/or operations in accordance with embodiments of the present disclosure may also perform other functions, steps, and operations neither considered nor discussed herein (e.g., the one or more processors being multi-functional and/or capable of multi-tasking).

Depending on the embodiment of the present disclosure, some or all of the steps and/or operations may be implemented or otherwise performed, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, portable digital assistants (PDAs), mp3 players, handheld PCs, instant messaging devices (IMD), cellular telephones, global navigational satellite system (GNSS) receivers, watches, or any such device which can be worn and/or carried on one's person.

While certain embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

What is claimed is:

1. A method for a global navigation satellite system (GNSS) receiver, comprising:
    summing correlations of received GNSS signals over time to generate a correlation window ($C_{window}$);
    preprocessing the generated $C_{window}$ to generate $C_{used}$;
    comparing the generated $C_{used}$ with a plurality of stored $C_{used}$s to find a matching stored $C_{used}$, wherein each of the plurality of stored $C_{used}$s is stored with a corresponding range error; and
    using the stored range error corresponding to the matching stored $C_{used}$ to improve a range measurement.

2. The method of claim 1, wherein preprocessing the generated $C_{window}$ to generate $C_{used}$ comprises:
    removing noise terms from the generated $C_{window}$ to generate $C_{minus\_noise}$.

3. The method of claim 2, wherein preprocessing the generated $C_{window}$ to generate $C_{used}$ comprises:
   normalizing the correlation amplitude of the generated $C_{minus\_noise}$ to generate $C_{normalized}$.

4. The method of claim 3, wherein preprocessing the generated $C_{window}$ to generate $C_{used}$ comprises:
   shortening $C_{normalized}$ to generate $C_{used}$.

5. The method of claim 1, further comprising:
   storing the plurality of stored $C_{used}$s with their corresponding range errors.

6. The method of claim 5, wherein the stored plurality of stored $C_{used}$s with their corresponding range errors were generated using correlation samples from at least one of field data collection and simulation.

7. The method of claim 1, wherein comparing the generated $C_{used}$ with the plurality of stored $C_{used}$s to find a matching stored $C_{used}$ comprises:
   using a sum of squares differences method to determine the stored $C_{used}$ with a minimum difference as the matching stored $C_{used}$.

8. The method of claim 7, wherein using a sum of squares differences method to determine the stored $C_{used}$ with a minimum difference as the matching stored $C_{used}$ comprises:
   applying the following equation:

$$S_{1,\ldots,M} = \Sigma_{1,\ldots,N}(P_{i,n} - C_n)^2$$

where
   $C_n$ is the value of the nth correlator of the generated $C_{used}$ (or pattern);
   $P_{i,n}$ is the value of the corresponding nth correlator in the ith stored $C_{used}$ (or pattern).
   N is the number of correlators,
   n is the index for the correlators,
   M is the number of stored $C_{used}$s, and
   i is the index for the stored $C_{used}$s.

9. The method of claim 8, wherein using a sum of squares differences method to determine the stored $C_{used}$ with a minimum difference as the matching stored $C_{used}$ comprises:
   finding the minimum summation among the $S_{1,\ldots,M}$ summations.

10. A global navigation satellite system (GNSS) receiver, comprising:
    one or more non-transitory computer-readable media; and
    at least one processor which, when executing instructions stored on one or more non-transitory computer readable media, performs the steps of:
       summing correlations of received GNSS signals over time to generate a correlation window ($C_{window}$);
       preprocessing the generated $C_{window}$ to generate $C_{used}$;
       comparing the generated $C_{used}$ with the plurality of stored $C_{used}$s to find a matching stored $C_{used}$, wherein each of the plurality of stored $C_{used}$s is stored with a corresponding range error; and
       using the stored range error corresponding to the matching stored $C_{used}$ to improve a range measurement.

11. The GNSS receiver of claim 10, wherein preprocessing the generated $C_{window}$ to generate $C_{used}$ comprises:
    removing noise terms from the generated $C_{window}$ to generate $C_{minus\_noise}$.

12. The GNSS receiver of claim 11, wherein preprocessing the generated $C_{window}$ to generate $C_{used}$ comprises:
    normalizing the correlation amplitude of the generated $C_{minus\_noise}$ to generate $C_{normalized}$.

13. The GNSS receiver of claim 12, wherein preprocessing the generated $C_{window}$ to generate $C_{used}$ comprises:
    shortening $C_{normalized}$ to generate $C_{used}$.

14. The GNSS receiver of claim 10, wherein the at least one processor, when executing instructions stored on one or more non-transitory computer readable media, performs the step of:
    storing the plurality of stored $C_{used}$s with their corresponding range errors.

15. The GNSS receiver of claim 10, wherein the stored plurality of stored $C_{used}$s with their corresponding range errors were generated using correlation samples from at least one of field data collection and simulation.

16. The GNSS receiver of claim 10, wherein comparing the generated $C_{used}$ with the plurality of stored $C_{used}$s to find a matching stored $C_{used}$ comprises:
    using a sum of squares differences method to determine the stored $C_{used}$ with a minimum difference as the matching stored $C_{used}$.

17. The GNSS receiver of claim 16, wherein using a sum of squares differences method to determine the stored $C_{used}$ with a minimum difference as the matching stored $C_{used}$ comprises:
    applying the following equation:

$$S_{1,\ldots,M} = \Sigma_{1\ldots N}(P_{i,n} - C_n)^2$$

where
    $C_n$ is the value of the nth correlator of the generated $C_{used}$ (or pattern);
    $P_{i,n}$ is the value of the corresponding nth correlator in the ith stored $C_{used}$ (or pattern).
    N is the number of correlators,
    n is the index for the correlators,
    M is the number of stored $C_{used}$s, and
    i is the index for the stored $C_{used}$s.

18. The GNSS receiver of claim 17, wherein using a sum of squares differences method to determine the stored $C_{used}$ with a minimum difference as the matching stored $C_{used}$ comprises:
    finding the minimum summation among the $S_{1,\ldots,M}$ summations.

* * * * *